Dec. 26, 1967  H. E. ROSENBERGER ETAL  3,360,327
ZOOM OPTICAL SYSTEM FOR MICROSCOPE
Filed Jan. 4, 1965  2 Sheets-Sheet 1

HAROLD E. ROSENBERGER
RICHARD L. SEIDENBERG
JOHN H. SMALL
INVENTORS

BY Frank C. Parker
ATTORNEY

3,360,327
ZOOM OPTICAL SYSTEM FOR MICROSCOPE
Harold E. Rosenberger, Brighton, Richard L. Seidenberg, Rochester, and John H. Small, Buffalo, N.Y., assignors to Bausch & Lomb Incorporated, Rochester, N.Y., a corporation of New York
Filed Jan. 4, 1965, Ser. No. 423,101
3 Claims. (Cl. 350—184)

The present invention relates to an optical system for a microscope and more particularly relates to improvements in a zoom type of pancratic optical system therefor.

The aforementioned pancratic optical system of the present invention is related to the optical system disclosed in the patent application of H. E. Rosenberger, Serial No. 376,009, filed June 18, 1964. There is a fundamental difference, however, between the two systems which is pointed out herebelow. In comparatively low-powered microscope zoom systems having zoom ranges of 25X–100X or 50X–200X magnification, for instance, the zoom type objective works at negative magnification so that it forms a real image at the eyepiece focal plane. Comparatively high-powered negative magnification zoom systems such as 100X–400X magnification cannot practically be so constructed because of the high numerical aperture and in such systems, the zoom type objective works at positive magnification forming a virtual image near the specimen plane. The virtual image is reimaged by a subsequent relay lens to form a real image in the eyepiece focal plane in a manner resembling in some respects the optical system disclosed in the patent application of H. E. Rosenberger and H. D. Korones, Serial No. 113,474, filed May 29, 1961, now Patent No. 3,170,984.

It is an object of the present application to provide a novel zoom type of pancratic optical system for a microscope adapted for use in a comparatively high magnification range, the image produced by said system being well corrected for all chromatic and monochromatic aberrations.

A further object is to provide such an optical system which is simple in construction and low in cost but capable of high grade performance.

Further objects and advantages reside in the combination and detailed construction of the component parts of the optical system as described in the following specification taken together with the accompanying drawings, in which.

Figure 1:
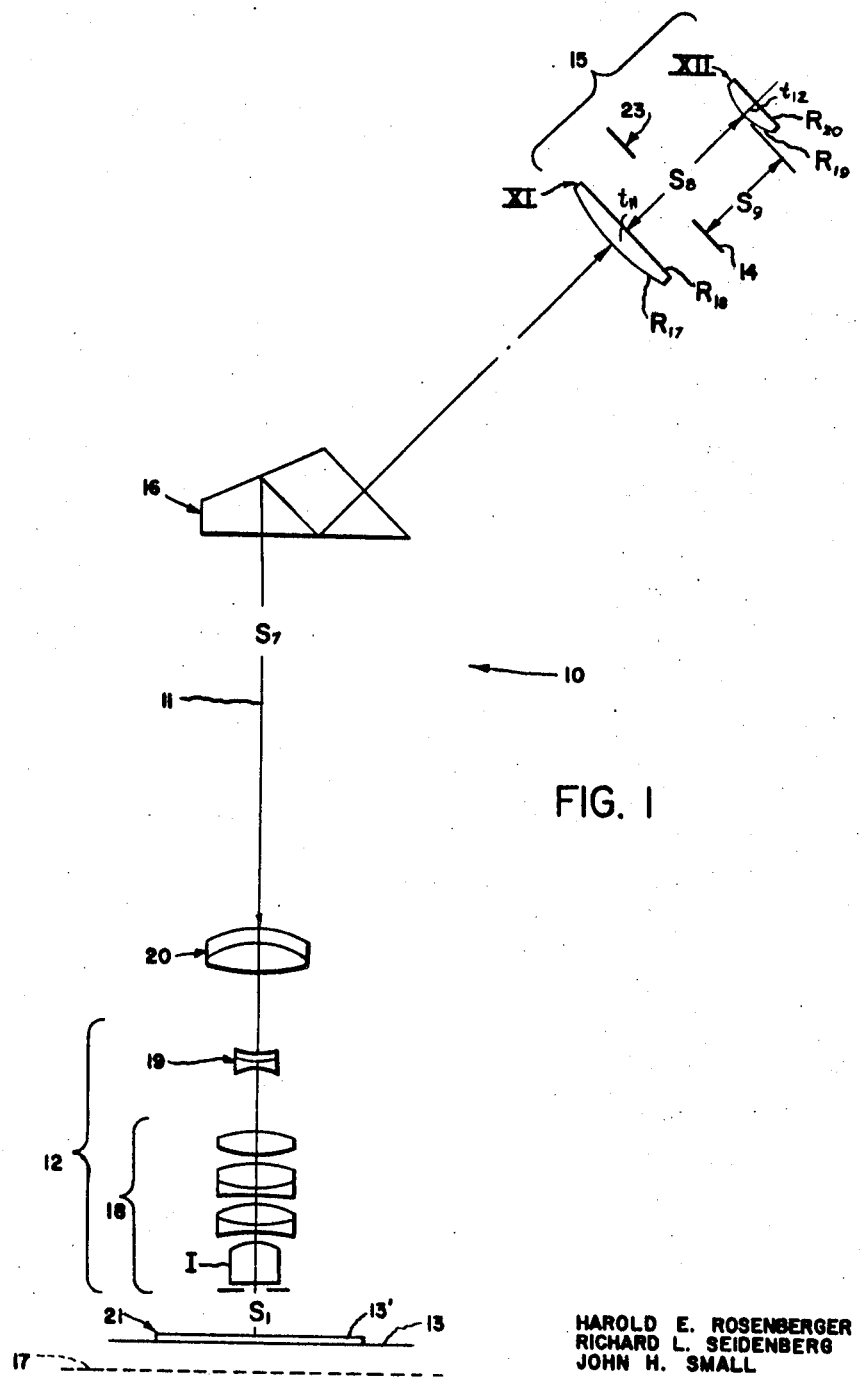
FIG. 1 is an optical diagram showing the entire microscope optical system.

With reference first to FIG. 1 of the drawings, there is here shown a zoom type of pancratic optical system which is designated generally by the numeral 10. Located on a vertical portion of optical axis 11 is a zoom type of objective which is designated by the numeral 12, said objective forming an image of variable magnification of a specimen or object surface 13 at a virtual image plane 17. For viewing said image a relay lens 20 designated to relay said virtual image plane 17 into the eyepiece focal plane, and an eyepiece 15 for viewing said relayed image, are provided. Intervening between the relay lens 20 and eyepiece 15 is provided an inclination prism 16 whereby the optical axis of the optical system 10 is folded and inclined to permit a more comfortable posture by the observer while using the instrument.

According to the present invention, the optical parts comprising the complete microscope optical system 10 are so arranged and constructed so as to form per se a well corrected image of comparatively high power, at least as high as 400X, and the objective 12 works at positive magnification. In such a system, the objective 12 has such a high numerical aperture that in order to achieve satisfactory optical correction, the image 17 is virtual and is formed in the vicinity of the specimen or object surface at variable magnification.

Figure 3:
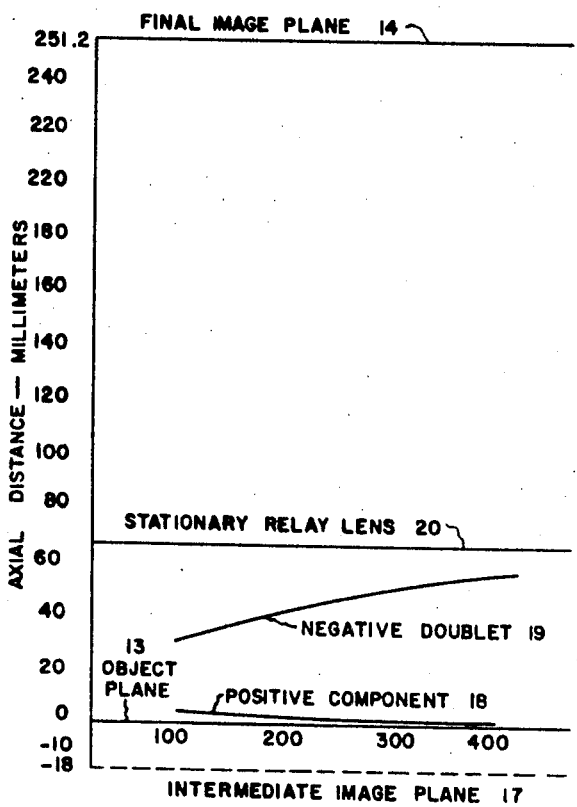
FIG. 3 is a graph showing the motion of the moving parts of said objective.

Said virtual image 17 is formed by the combination of a front positive group 18 of lenses which are moved as a unit axially at a different predetermined rate relative to the movement of a rearwardly spaced negative corrector lens 19 as shown in the motion diagram, FIG. 3. Located in rearward position of the objective 12 is a stationary positive relay lens 20 which forms a real image of the virtual image 17 at the eyepiece focal plane.

Figure 2:
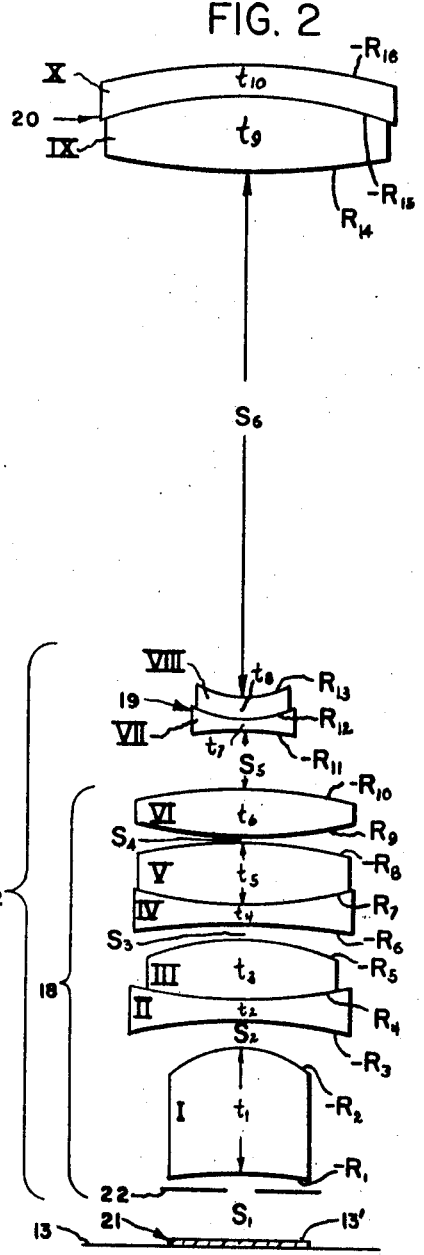
FIG. 2 is an optical diagram showing the pancratic objective portion of said optical system together with the relay lens at a different scale.

Comprised in said front positive group of lenses 18 is a front singlet positive meniscus lens which is designated I, as best shown in FIG. 2, and it is located at a variable axial distance designated $S_1$ from the exposed surface 13' of the cover glass 21. The axial thickness of lens I is designated $t_1$ and the focal length thereof is designated $F_1$.

Spaced at an axial distance of substantially .00684D toward the cover glass 21 from the vertex of the front surface of lens I is an aperture plate 22, the D quantity representing the axial distance from the specimen plane through lens X. The aperture plate 22 is provided in the zoom type objective 12 for the purpose of controlling the numerical aperture of the objective such that it increases in substantially direct proportion to increase in the magnification thereof during the zooming motion. This function is previously described in the aforementioned Rosenberger patent application Serial No. 376,009. The diameter of the aperture in the aperture plate 22 lies between .0116D and .0141D and ideally is substantially .0128D.

Spaced rearwardly from lens I by an axial distance designated $S_2$ is a positive doublet lens of meniscus form, said lens having a concave surface facing lens I. Said doublet lens comprises a front double concave lens element, designated II which lies in contact with and may be cemented to a rearward double convex lens element which is designated III. The axial thicknesses of lens elements II and III are represented by $t_2$ and $t_3$ respectively.

A second positive double lens of meniscus form is spaced rearwardly of the first double lens by an axial distance designated $S_3$ and is concave toward the first doublet lens. Said second doublet lens is comprised of a front double concave lens element designated IV which lies in contact with a double convex lens element designated V. The axial thicknesses of lens elements IV and V are designated respectively $t_4$ and $t_5$.

The rearmost member of the aforesaid movable positive lens group or unit 18 is a singlet double convex lens designated VI which is spaced rearwardly of said second doublet lens by an axial distance designated $S_4$. Designation $t_6$ is given to the axial thickness of lens VI. As aforesaid, it will be understood that all of the lenses I to VI are held in a suitable movably mounted sleeve or tube, not shown, as an optical unit having positive or converging power, the axial motion of which is shown in the graph, FIG. 3.

Concomitantly with the motion of optical unit 18, the corrector lens 19 is moved axially as previously mentioned and as shown in the graph of FIG. 3. Corrector lens 19 is a negative doublet comprising a front double concave lens element designated VII which is preferably cemented to a rear positive meniscus lens element designated VIII. Said corrector lens 19 is spaced at a variable axial distance $S_5$ rearwardly of lens unit 18 and in combination therewith forms a virtual image 17 of the specimen surface 13 at variable magnification ahead of said unit in the vicinity of said specimen surface as shown in FIG. 1. The axial thicknesses of the lens elements VII and VIII are designated $t_7$ and $t_8$ respectively. In the present instance, the magnification of the objective 12 varies substantially between 5X and 20X.

Spaced still further rearwardly at a variable axial distance designated $S_6$ from the corrector lens 19 is the aforesaid stationary positive relay lens 20 which forms a real image at the front focal plane of the eyepiece 15, said relay lens comprising a front double convex lens element IX which is preferably cemented to a rear negative meniscus lens element designated X. The designations for the axial thicknesses of lens elements IX and X are respectively $t_9$ and $t_{10}$.

For the purpose of achieving an unusually fine state of correction of image aberrations in the optical system 10 throughout the entire range of magnification of at least an upper value of 400X, the constructional data therefor have been selected in accordance with extensive calculations and experimentation. Said constructional data are presented herebelow in the mathematical statements contained in the Table A wherein $F_1$, $-F_2$, $F_3$, $-F_4$, $F_5$, $F_6$, $-F_7$, $F_8$, $F_9$ and $-F_{10}$ represent the equivalent focal lengths of the successive individual lens parts I to X, the values thereof being given in terms of D which represents the axial distance from the specimen plane through lens X, the minus (—) sign denoting negative focal lengths. The values also are given for said lens thicknesses $t_1$ to $t_{10}$ and said air spaces $S_1$ to $S_6$, the values for the variable air spaces $S_1$, $S_5$ and $S_6$ being given for low, high and median magnifications of the image.

TABLE A $.1591D < F_1 < .1945D$  $.0978D < t_1 < .1194D$
$.2345D < -F_2 < .2867D$  $.01722D < t_2 < .02100D$
$.2039D < F_3 < .2491D$  $.04915D < t_3 < .06007D$
$.2852D < -F_4 < .3486D$  $.01722D < t_4 < .02100D$
$.2087D < F_5 < .2541D$  $.05418D < t_5 < .06620D$
$.4450D < F_6 < .5430D$  $.0344D < t_6 < .0420D$
$.1057D < -F_7 < .1291D$  $.00985 < t_7 < .01204D$
$.2466D < F_8 < .3014D$  $.01725D < t_8 < .02106D$
$.3753D < F_9 < .4587D$  $.05660D < t_9 < .06906D$
$.8455D < -F_{10} < 1.0334D$  $.02466D < t_{10} < .03014D$ $.04640D < S_1 < .05680D$ (low magnification)
$.02156D < S_1 < .02634D$ (median magnification)
$.01354D < S_1 < .01656D$ (high magnification)
$.01401D < S_2 < .01713D$
$.002470D < S_3 < .003010D$
$.001723D < S_4 < .002105D$
$.04540D < S_5 < .05540D$ (low magnification)
$.2506D < S_5 < .3062D$ (median magnification)
$.3890D < S_5 < .4750D$ (high magnification)
$.4100D < S_6 < .5020D$ (low magnification)
$.2317D < S_6 < .2831D$ (median magnification)
$.1006D < S_6 < .1228D$ (high magnification)

Furthermore, the equivalent focal lengths designated by E.F.L. and axial thicknesses of the successive compound lenses in the optical system have values as set forth in the Table B of mathematical statements herebelow,

TABLE B

| Lens | E.F.L. | Thicknesses |
|---|---|---|
| First doublet lens | .829 to 1.013D | .0664D to .0812D. |
| Second doublet lens | .622D to .760D | .0714D to .0872D. |
| Corrector lens 19 | —.1619D to —.1979D | .0271D to .0331D. |
| Relay lens 20 | .681D to .813D | .0812D to .0992D. |

More specifically, the values for the aforesaid focal lengths, axial thicknesses, and air spaces corresponding to Table A are given in Table C herebelow for the zoom type objective 12.

TABLE C $F_1 = .1768D$  $t_1 = .1086D$
$-F_2 = .2606D$  $t_2 = .01911D$
$F_3 = .2265D$  $t_3 = .05461D$
$-F_4 = .3169D$  $t_4 = .01911D$
$F_5 = .2314D$  $t_5 = .06019D$
$F_6 = .4940D$  $t_6 = .0382D$
$-F_7 = .1174D$  $t_7 = .01094D$
$F_8 = .2740D$  $t_8 = .01915D$
$F_9 = .4170D$  $t_9 = .06290D$
$-F_{10} = .9395D$  $t_{10} = .02740D$ $S_1 = .05160D$ (low magnification)
$S_1 = .02395D$ (median magnification)
$S_1 = .01505D$ (high magnification)
$S_2 = .01557D$
$S_3 = .002740D$
$S_4 = .001914D$
$S_5 = .05040D$ (low magnification)
$S_5 = .27840D$ (median magnification)
$S_5 = .4320D$ (high magnification)
$S_6 = .4560D$ (low magnification)
$S_6 = .2574D$ (median magnification)
$S_6 = .11170D$ (high magnification)

With reference to the radii of the successive lens surfaces $-R_1$ to $-R_{16}$ of the lens parts I to X, the values thereof are given in terms of D in Table D herebelow wherein the minus (—) sign signifies lens surfaces which are concave toward the object surface 13, the values for the D spectral line (0.5893 microns) also being given for the refractive indices $n_D(I)$ to $n_D(X)$ and the Abbé numbers $\nu(I)$ to $\nu(X)$ of the glasses in said lens parts.

TABLE D $.7911D < -R_1 < .9669D$  $1.512 < n_D(III) < 1.522$
$.0777D < -R_2 < .0949D$  $1.715 < n_D(IV) < 1.725$
$.3996D < -R_3 < .4884D$  $1.615 < n_D(V) < 1.625$
$.2981D < R_4 < .3643D$  $1.512 < n_D(VI) < 1.522$
$.1535D < -R_5 < .1877D$  $1.512 < n_D(VII) < 1.522$
$1.230D < -R_6 < 1.504D$  $1.746 < n_D(VIII) < 1.756$
$.2478D < R_7 < .3028D$  $1.512 < n_D(IX) < 1.522$
$.2478D < -R_8 < .3028D$  $1.715 < n_D(X) < 1.725$
$.3144D < R_9 < .3842D$  $60.0 < \nu(I) < 70.0$
$.8208D < -R_{10} < 1.0032D$  $24.0 < \nu(II) < 34.0$
$.4230D < -R_{11} < .5170D$  $60.0 < \nu(III) < 70.0$
$.0630D < R_{12} < .0770D$  $24.0 < \nu(IV) < 34.0$
$.0851D < R_{13} < .1041D$  $55.0 < \nu(V) < 65.0$
$.4896D < R_{14} < .5984D$  $60.0 < \nu(VI) < 70.0$
$.3091D < -R_{15} < .3777D$  $60.0 < \nu(VII) < 70.0$
$.6588D < -R_{16} < .8052D$  $23.0 < \nu(VIII) < 33.0$
$1.512 < n_D(I) < 1.522$  $60.0 < \nu(IX) < 70.0$
$1.715 < n_D(II) < 1.725$  $24.0 < \nu(X) < 34.0$

Specifically or ideally, the values set forth in Table D should be substantially as given in corresponding Table E herebelow, the symbolism remaining the same,

TABLE E $-R_1 = .8790D$  $n_D(III) = 1.517$
$-R_2 = .0863D$  $n_D(IV) = 1.720$
$-R_3 = .4440D$  $n_D(V) = 1.620$
$R_4 = .3312D$  $n_D(VI) = 1.517$
$-R_5 = .1706D$  $n_D(VII) = 1.517$
$-R_6 = 1.367D$  $n_D(VIII) = 1.751$
$R_7 = .2754D$  $n_D(IX) = 1.517$
$-R_8 = .2753D$  $n_D(X) = 1.720$
$R_9 = .3493D$  $\nu(I) = 65.0$
$-R_{10} = .9120D$  $\nu(II) = 29.0$
$-R_{11} = .4700D$  $\nu(III) = 65.0$
$R_{12} = .0700D$  $\nu(IV) = 29.0$
$R_{13} = .0946D$  $\nu(V) = 60.0$
$R_{14} = .5440D$  $\nu(VI) = 65.0$
$-R_{15} = .3434D$  $\nu(VII) = 65.0$
$-R_{16} = .7320D$  $\nu(VIII) = 28.0$
$n_D(I) = 1.517$  $\nu(IX) = 65.0$
$n_D(II) = 1.720$  $\nu(X) = 29.0$

Spaced rearwardly of said relay lens 20 at a long axial distance designated $S_7$, is the aforesaid eyepiece 15 having its eyepiece focal plane coincident with the image 14, said distance $S_7$ being computed along the optical path through said inclination prism 16. Said eyepiece 15 is corrected aberrationwise in such a manner as to help reduce the residual aberrations in the objective 12 and comprises a a front positive singlet lens which is designated XI in addition to a rear positive singlet lens which is designated XII.

Ideally, lenses XI and XII have a singlet plano-convex form, the steep curvature sides thereof facing forwardly. Lenses XI and XII are spaced apart by a fixed axial distance designated $S_8$ and lens XII is furthermore spaced at an axial distance $S_9$ rearwardly from an eyepiece diaphragm 23 which is located substantially at the image plane 14. An aperture is formed in the diaphragm 23 having a diameter of substantially .2252D.

The successive lens surfaces of lenses XI and XII are designated $R_{17}$ to $R_{20}$ and their respective thicknesses are designated $t_{11}$ and $t_{12}$, the respective refractive index $n_D$ and Abbé number $\nu$ being designated $n_D(XI)$, $\nu(XI)$ and $n_D(XII)$, $\nu(XII)$. The corresponding designations for focal length of lenses XI and XII are $F_{11}$ and $F_{12}$ respectively.

With respect to the constructional data for the eyepiece 15, the values for the above-designated lens characteristics are given in terms of D for all except the refractive index and Abbé number values which are absolute values in the consolidated Table F herebelow,

TABLE F

| | |
|---|---|
| $.621D < F_{11} < .759D$ | $.278D < S_9 < .340D$ |
| $.2858D < F_{12} < .3492D$ | $.0418D < t_{11} < .0510D$ |
| $.4461D < R_{17} < .5453D$ | $.0273D < t_{12} < .0345D$ |
| $R_{18} > \pm 5.0D$ | $1.715 < n_D(XI) < 1.725$ |
| $.1477D < R_{19} < .1805D$ | $24.0 < n_D(XII) < 34.0$ |
| $R_{20} > \pm 5.0D$ | $1.512 < \nu(XI) < 1.522$ |
| $2.045D < S_7 < 2.499D$ | $60.0 < \nu(XII) < 70.0$ |
| $.377D < S_8 < .461D$ | |

Ideally, the values given in Table F should be as given in Table G herebelow,

TABLE G

| | |
|---|---|
| $F_{11} = .6900D$ | $S_9 = .309D$ |
| $F_{12} = .3175D$ | $t_{11} = .0464D$ |
| $R_{17} = .4957D$ | $t_{12} = .0314D$ |
| $R_{18} = $ PLANO | $n_D(XI) = 1.720$ |
| $R_{19} = .1641D$ | $n_D(XII) = 1.517$ |
| $R_{20} = $ PLANO | $\nu(XI) = 29.3$ |
| $S_7 = 2.272D$ | $\nu(XII) = 64.5$ |
| $S_8 = .419D$ | |

It will be understood from the foregoing description that there is here provided a zoom optical system for microscopes having a comparatively high magnification of at least 400X, the objective of which has a high numerical aperture in order to achieve satisfactory optical correction.

Although only a single form of the present invention has been shown and described in detail, other forms and arrangements are possible and changes may be made in the constructional details within the limits specified herein without departing from the spirit of the invention as defined in the appended claims.

We claim:

1. A pancratic optical system for a microscope including a zoom type of objective for forming an image having a magnification range of at least 1:4, said objective comprising a positive front group of lenses and a rearward negative corrector lens adjacent thereto, said group being moved as a unit simultaneously with movements of said negative corrector lens to form a virtual image of variable magnification, a stationary positive relay lens which is spaced rearwardly of said corrector lens and forms a real image of constant magnification at the eyepiece focal plane of microscope, said front group of lenses comprising a positive meniscus singlet lens which is designated I and is spaced next rearwardly of the microscope cover glass at a variable distance $S_1$, a first doublet lens spaced at an axial distance $S_2$ from lens I and being comprised of a front double concave lens element designated II which lies in contact with a rear double convex element designated III, a second doublet lens spaced at an axial distance $S_3$ rearwardly from lens element III and comprised of a front double concave lens element designated IV which lies in contact with a rear double convex lens element designated V, a singlet positive lens designated VI spaced from lens element V at an axial distance designated $S_4$, said negative corrector lens being a doublet and being spaced rearwardly of lens VI at a variable axial distance designated $S_5$, said doublet being comprised of a front double concave lens element designated VII which lies in contact on its rear surface with a convex-concavo lens element designated VIII, said relay lens being spaced at a variable distance designated $S_6$ rearwardly of said corrector lens and being comprised of a front double convex lens element designated IX which lies in contact with a rear concavo-convex element designated X, the individual equivalent focal lengths of the lens element I to X being designated respectively $F_1$, $-F_2$, $F_3$, $-F_4$, $F_5$, $F_6$, $-F_7$, $F_8$, $F_9$ and $-F_{10}$ and having specific values substantially as given in the table herebelow, the minus (—) sign signifying negative focal lengths, the axial thickness of said lens elements being designated respectively $t_1$ to $t_{10}$ and having specific values substantially as given in the table herebelow, the successive air spaces between said cover glass and said relay lens being designated respectively $S_1$ to $S_6$ and having specific values substantially as given in the table herebelow, the values for the variable spaces $S_1$, $S_5$ and $S_6$ being given for high, low and median magnifications of said system, said values being given in terms of D which represents the axial length of the objective from the specimen plane to $R_{16}$,

| | |
|---|---|
| $F_1 = .1768D$ | $F_6 = .4940D$ |
| $-F_2 = .2606D$ | $-F_7 = .1174D$ |
| $F_3 = .2265D$ | $F_8 = .2740D$ |
| $-F_4 = .3169D$ | $F_9 = .4170D$ |
| $F_5 = .2314D$ | $-F_{10} = .9395D$ |

$S_1 = .05160D$ (low magnification)
$S_1 = .02395D$ (median magnification)
$S_1 = .01505D$ (high magnification)
$S_2 = .01557D$
$S_3 = .002740D$
$S_4 = .001914D$
$S_5 = .05040D$ (low magnification)
$S_5 = .27840D$ (median magnification)
$S_5 = .4320D$ (high magnification)
$S_6 = .4560D$ (low magnification)
$S_6 = .25740D$ (median magnification)
$S_6 = .11170D$ (high magnification)

| | |
|---|---|
| $t_1 = .1086D$ | $t_6 = .0382D$ |
| $t_2 = .01911D$ | $t_7 = .01094D$ |
| $t_3 = .05461D$ | $t_8 = .01915D$ |
| $t_4 = .01911D$ | $t_9 = .06290D$ |
| $t_5 = .06019D$ | $t_{10} = .02740D$ | and an aperture plate located at a constant distance of substantially .00684D in front of lens I and having an aperture diameter of substantially .0128D.

2. A pancratic optical system for a microscope as set forth in claim 1 further characterized by the refractive indices and Abbé numbers of lenses I to X being designated $n_D(I)$ to $n_D(X)$ and $\nu(I)$ and $\nu(X)$ respectively, the specific values thereof being given substantially in the table herebelow,

| | |
|---|---|
| $n_D(I) = 1.517$ | $\nu(I) - 65.0$ |
| $n_D(II) = 1.720$ | $\nu(II) = 29.0$ |
| $n_D(III) = 1.517$ | $\nu(III) = 65.0$ |
| $n_D(IV) = 1.720$ | $\nu(IV) = 29.0$ |
| $n_D(V) = 1.620$ | $\nu(V) = 60.0$ |
| $n_D(VI) = 1.517$ | $\nu(VI) = 65.0$ |
| $n_D(VII) = 1.517$ | $\nu(VII) = 65.0$ |
| $n_D(VIII) = 1.751$ | $\nu(VIII) = 28.0$ |
| $n_D(IX) = 1.517$ | $\nu(IX) = 65.0$ |
| $n_D(X) = 1.720$ | $\nu(X) = 29.0$ |

3. A pancratic optical system for microscopes as set forth in claim 2 further characterized by the radii of the successive lens surfaces of lenses I to X being designated respectively by the symbols $-R_1$, $-R_2$, $-R_3$, $R_4$, $-R_5$, $-R_6$, $R_7$, $-R_8$, $R_9$, $-R_{10}$, $-R_{11}$, $R_{12}$, $R_{13}$, $R_{14}$, $-R_{15}$ and $-R_{16}$, the specific values thereof being given substantially in terms of the aforesaid quantity D in the table herebelow wherein the minus (—) sign signifies lens surfaces which are concave toward said cover glass,

| | |
|---|---|
| $-R_1 = .8790D$ | $R_9 = .3493D$ |
| $-R_2 = .0863D$ | $-R_{10} = .9120D$ |
| $-R_3 = .4440D$ | $-R_{11} = .4700D$ |
| $R_4 = .3312D$ | $R_{12} = .0700D$ |
| $-R_5 = .1706D$ | $R_{13} = .0946D$ |
| $-R_6 = 1.367D$ | $R_{14} = .5440D$ |
| $R_7 = .2753D$ | $-R_{15} = .3434D$ |
| $-R_8 = .2753D$ | $R_{16} = .7320D$ |

No references cited.

DAVID H. RUBIN, *Primary Examiner.*

R. J. STERN, *Assistant Examiner.*

UNITED STATES PATENT OFFICE

CERTIFICATE OF CORRECTION

Patent No. 3,360,327            December 26, 1967

Harold E. Rosenberger et al.

It is certified that error appears in the above identified patent and that said Letters Patent are hereby corrected as shown below:

Column 4, TABLE E, first column, line 7 thereof, $R_7 = .2754D$     should read     $R_7 = .2753D$ Signed and sealed this 18th day of November 1969.

(SEAL)
Attest:

Edward M. Fletcher, Jr.          WILLIAM E. SCHUYLER, JR.
Attesting Officer               Commissioner of Patents